(12) United States Patent
Hamman et al.

(10) Patent No.: US 12,499,735 B2
(45) Date of Patent: Dec. 16, 2025

(54) SYSTEM AND METHOD FOR PROVIDING AN ENHANCED KENO GAME INCORPORATING A BONUS FEATURE

(71) Applicant: SCA PROMOTIONS, Dallas, TX (US)

(72) Inventors: Robert D. Hamman, Dallas, TX (US); Jay B. Ross, Delran, NJ (US)

(73) Assignee: SCA PROMOTIONS, Dallas, TX (US)

(*) Notice: Subject to any disclaimer, the term of this patent is extended or adjusted under 35 U.S.C. 154(b) by 0 days.

(21) Appl. No.: 19/065,482

(22) Filed: Feb. 27, 2025

(65) Prior Publication Data

US 2025/0322725 A1 Oct. 16, 2025

Related U.S. Application Data

(60) Provisional application No. 63/731,274, filed on Apr. 16, 2024.

(51) Int. Cl.
*G07F 17/32* (2006.01)

(52) U.S. Cl.
CPC ...... *G07F 17/3262* (2013.01); *G07F 17/3244* (2013.01); *G07F 17/329* (2013.01); *G07F 17/3211* (2013.01)

(58) Field of Classification Search
CPC .......... G07F 17/329; G06F 7/58; G06F 7/582; G06F 7/588
See application file for complete search history.

(56) References Cited

U.S. PATENT DOCUMENTS

| | | | |
|---|---|---|---|
| 8,628,406 B1* | 1/2014 | Gibase | G07F 17/32 463/20 |
| 8,740,687 B1* | 6/2014 | Brown | G07F 17/326 463/16 |
| 11,594,104 B2 | 2/2023 | Daley et al. | |
| 2004/0173965 A1 | 9/2004 | Stanek | |
| 2007/0117611 A1* | 5/2007 | Dodge | G06Q 20/201 463/18 |
| 2007/0155470 A1* | 7/2007 | Brunelle | G07F 17/3244 463/18 |
| 2007/0167216 A1* | 7/2007 | Walker | G07F 17/3239 463/18 |
| 2010/0281088 A1* | 11/2010 | Wilber | G06F 7/588 708/251 |
| 2011/0003626 A1* | 1/2011 | Meyer | G07F 17/3244 463/25 |
| 2012/0252550 A1* | 10/2012 | Seaton | G07F 17/3286 463/18 |
| 2014/0228089 A1* | 8/2014 | Seaton | G07F 17/3267 463/18 |
| 2014/0309012 A1* | 10/2014 | Anderson | G07F 17/34 463/20 |

(Continued)

*Primary Examiner* — Milap Shah
(74) *Attorney, Agent, or Firm* — Meagher Emanuel Laks Goldberg & Liao, LLP

(57) ABSTRACT

A method and system for producing an enhanced keno game that provides a bonus feature that increases the odds of winning a monetary prize. The bonus feature increases the opportunity to guess winning numbers and therefore improves a keno player's winnings for a keno game and allows multiple players to participate concurrently. The winning payout to a player is predefined by a published "paytable" established prior to the start of the game.

7 Claims, 17 Drawing Sheets

(56) References Cited

U.S. PATENT DOCUMENTS

| | | | |
|---|---|---|---|
| 2016/0110964 A1* | 4/2016 | Brown | G07F 17/32 |
| | | | 463/31 |
| 2016/0337129 A1* | 11/2016 | Hamman | G06F 21/645 |
| 2017/0083289 A1* | 3/2017 | Hoeppner | G06F 7/588 |
| 2019/0188965 A1* | 6/2019 | Brown | G07F 17/3262 |
| 2019/0259245 A1* | 8/2019 | Brown | G07F 17/32 |
| 2021/0082250 A1* | 3/2021 | Brown | G07F 17/3267 |
| 2021/0142611 A1* | 5/2021 | Brown | G07F 17/3211 |
| 2023/0370058 A1* | 11/2023 | Benea | G06F 7/588 |
| 2025/0307864 A1* | 10/2025 | Edsall | G07F 17/3255 |
| 2025/0308329 A1* | 10/2025 | Edsall | G06Q 20/20 |

* cited by examiner

| Numbers Picked | Numbers | Odds of Hitting |
|---|---|---|
| 1 Number | 1 | 1 in 4 |
|  | 0 | 1 in 3.33 |
| 2 Numbers | 2 | 1 in 16.63 |
|  | 1 | 1 in 2.63 |
| 3 Numbers | 3 | 1 in 72.07 |
|  | 2 | 1 in 7.20 |
| 4 Numbers | 4 | 1 in 326 |
|  | 3 | 1 in 23.12 |
|  | 2 | 1 in 4.70 |
| 5 Numbers | 5 | 1 in 1551 |
|  | 4 | 1 in 82.70 |
|  | 3 | 1 in 11.91 |
| 6 Numbers | 6 | 1 in 7752 |
|  | 5 | 1 in 323.03 |
|  | 4 | 1 in 35.04 |
|  | 3 | 1 in 7.70 |
| 7 Numbers | 7 | 1 in 40,979 |
|  | 6 | 1 in 1,366 |
|  | 5 | 1 in 116 |
|  | 4 | 1 in 19.16 |
|  | 3 | 1 in 5.71 |
| 8 Numbers | 8 | 1 in 230,114 |
|  | 7 | 1 in 6,232.27 |
|  | 6 | 1 in 422.53 |
|  | 5 | 1 in 54.64 |
|  | 4 | 1 in 12.27 |
| 9 Numbers | 9 | 1 in 1,380,687 |
|  | 8 | 1 in 30,682 |
|  | 7 | 1 in 1,690 |
|  | 6 | 1 in 174.84 |
|  | 5 | 1 in 30.67 |
|  | 4 | 1 in 8.76 |
|  | 3 | 1 in 4.06 |
| 10 Numbers | 10 | 1 in 8,911,711 |
|  | 9 | 1 in 163,381 |
|  | 8 | 1 in 7,384 |
|  | 7 | 1 in 621 |
|  | 6 | 1 in 87.11 |
|  | 5 | 1 in 19.44 |
|  | 0 | 1 in 21.84 |
| 11 Numbers | 11 | 1 in 62,381,978 |
|  | 10 | 1 in 945,181 |
|  | 9 | 1 in 35,244 |
|  | 8 | 1 1 in 2,430 |
|  | 7 | 1 in 277 |
|  | 4 | 1 in 5.60 |
|  | 2 | 1 in 6.95 |
|  | 0 | 1 in 30.57 |

| Numbers Picked | Numbers Matched | Odds of Hitting |
|---|---|---|
| 12 Numbers | 12 | 1 in 478,261,833 |
|  | 11 | 1 in 5,978,272 |
|  | 10 | 1 in 184,230 |
|  | 9 | 1 in 10,482 |
|  | 8 | 1 in 981 |
|  | 7 | 1 in 142.30 |
|  | 4 | 1 in 4.86 |
|  | 2 | 1 in 4.21 |
|  | 0 | 1 in 43.05 |
| 13 Numbers | 13 | 1 in 4,065,225,581 |
|  | 12 | 1 in 41,694,621 |
|  | 11 | 1 in 1,060,032 |
|  | 10 | 1 in 49,845 |
|  | 9 | 1 in 3,847 |
|  | 8 | 1 in 458.05 |
|  | 7 | 1 in 81.20 |
|  | 4 | 1 in 4.40 |
|  | 2 | 1 in 4.84 |
|  | 0 | 1 in 60.99 |
| 14 Numbers | 14 | 1 in 38,910,016,281 |
|  | 13 | 1 in 324,250,135 |
|  | 12 | 1 in 6,764,018 |
|  | 11 | 1 in 262,397 |
|  | 10 | 1 in 16,739 |
|  | 9 | 1 in 1,644 |
|  | 8 | 1 in 239 |
|  | 7 | 1 in 50.37 |
|  | 4 | 1 in 4.13 |
|  | 2 | 1 in 5.67 |
|  | 0 | 1 in 86.95 |
| 15 Numbers | 15 | 1 in 428,010,179,098 |
|  | 14 | 1 in 2,853,401,194 |
|  | 13 | 1 in 48,362,732 |
|  | 12 | 1 in 1,539,397 |
|  | 11 | 1 in 81,020 |
|  | 10 | 1 in 6,576 |
|  | 9 | 1 in 790 |
|  | 8 | 1 in 136 |
|  | 7 | 1 in 33.46 |
|  | 4 | 1 in 4.00 |
|  | 3 | 1 in 4.16 |
|  | 2 | 1 in 6.76 |
|  | 1 | 1 in 19.13 |
|  | 0 | 1 in 125 |

Figure 4

| Numbers Picked | Numbers Matched | Prize Amount (for each $1 play) |
| --- | --- | --- |
| 1 | 1 | $2 |
| 2 | 2 | $10 |
| 3 | 3 | $25 |
|  | 2 | $2 |
| 4 | 4 | $50 |
|  | 3 | $5 |
|  | 2 | $1 |
| 5 | 5 | $500 |
|  | 4 | $15 |
|  | 3 | $2 |
| 6 | 6 | $1,500 |
|  | 5 | $50 |
|  | 4 | $5 |
|  | 3 | $1 |
| 7 | 7 | $5,000 |
|  | 6 | $150 |
|  | 5 | $15 |
|  | 4 | $2 |
|  | 3 | $1 |
| 8 | 8 | $15,000 |
|  | 7 | $400 |
|  | 6 | $50 |
|  | 5 | $10 |
|  | 4 | $2 |
| 9 | 9 | $25,000 |
|  | 8 | $2,500 |
|  | 7 | $200 |
|  | 6 | $25 |
|  | 5 | $4 |
|  | 4 | $1 |
| 10 | 10 | $200,000 |
|  | 9 | $10,000 |
|  | 8 | $500 |
|  | 7 | $50 |
|  | 6 | $10 |
|  | 5 | $3 |
|  | 0 | $3 |

| Pool Count (P) | Total Spots (M) | Player Plays (N) | Bonus Numbers (M-N) |
|---|---|---|---|
| 80 | 20 | 1 | 19 |
| 80 | 20 | 2 | 18 |
| 80 | 20 | 3 | 17 |
| 80 | 20 | 4 | 16 |
| 80 | 20 | 5 | 15 |
| 80 | 20 | 6 | 14 |
| 80 | 20 | 7 | 13 |
| 80 | 20 | 8 | 12 |
| 80 | 20 | 9 | 11 |
| 80 | 20 | 10 | 10 |
| 80 | 20 | 11 | 9 |
| 80 | 20 | 12 | 8 |
| 80 | 20 | 13 | 7 |
| 80 | 20 | 14 | 6 |
| 80 | 20 | 15 | 5 |
| 80 | 20 | 16 | 4 |
| 80 | 20 | 17 | 3 |
| 80 | 20 | 18 | 2 |
| 80 | 20 | 19 | 1 |
| 80 | 20 | 20 | 0 |

Figure 13

SYSTEM AND METHOD FOR PROVIDING AN ENHANCED KENO GAME INCORPORATING A BONUS FEATURE

CROSS-REFERENCE TO RELATED APPLICATION

This application claims the priority and all the benefits of U.S. Provisional Application No. 63/731,274 filed on Apr. 16, 2024, the content of which is hereby incorporated by reference in its entirety.

TECHNICAL FIELD

The invention relates generally to casino-type games such as keno and more specifically to a method and system that provides a bonus feature for the game of keno. Current keno games do not allow keno players to improve their odds of winning a monetary prize by incorporating an extra financial transaction for allowing the player to bet on bonus spots.

BACKGROUND

Keno is a lottery-like gambling game played at modern casinos, and is seen as a variant in some public game offerings. The word "keno" has French or Latin roots, and by all accounts, the game originated in China. The Chinese played the game using sheets printed with Chinese characters, often the first 80 characters of the Thousand Character Classic (a Chinese poem used for teaching Chinese characters to children), from which the winning characters were selected. Eventually, Chinese immigrants introduced keno to the West (US, etc.) in the 19th century. There were also other, earlier games called Keno, but these were played in the same way as the game now known as "Bingo", not the modern game of Keno.

Games of chance such as keno, have been developed with features intended to increase a player's interest. Wagering games may include one or more bonus feature(s) to win further monetary awards. Over the years, such games of chance have introduced other features with increasing sophistication, such as a video function to introduce graphics or animation to the game. However, this new invention enhances the ability to improve financial winnings by adding an additional payout option for keno.

The key concept of a prior art keno game is for a contestant to guess in advance the subset of numbers that will be selected at a future specified number drawing. To ensure that there is a sufficient quantity of number subsets for winning number combinations, the number range must be sufficiently large. By example, the range of numbers can be 1-80 (inclusive), with a player guessing up to 20 number values, and this combination meets the criteria for sufficient quantity.

As indicated above, prior art keno games allow keno players to place a wager by choosing a group of 20 numbers or less from a larger set of numbers. By example, the larger set of numbers range from 1 through 80. After all the players make their wagers (in a limited time window). Twenty numbers may be selected at random by the host as a "drawing". The numbers are selected by a random number source.

In order to play a prior art Keno game, a player must fill out a "play ticket" and submit the ticket with funds for their bet in advance of the drawing. An unmarked ticket is called a "blank". Keno payouts are based on how many numbers the player chooses and how many of those numbers are "hit" during the number drawing. A hit is defined as a number marked on a player's ticket matching that of a random drawn number. Spots are the numbers chosen and marked by the player on the keno ticket. The hits are factored by the proportion of the player's original wager to the "base rate". The base rate is the minimum amount of a wager that can be placed. As a probability, the more numbers a player chooses, the more likely numbers will be hit, and the greater the payout might be. It is not uncommon to see casinos paying $500 or even $1,000 for a "catch". A catch is defined as hitting a number marked on a keno ticket. Payouts vary widely by casino. Most casinos allow wagers on 1 through 20 numbers, but some limit the choice to only 1 through 10, 12 or 15 "spots". The probability of a player hitting all 20 numbers on a 20 spot ticket is effectively 1 in 3,535,316,142,212,174,320.

Each Keno host (casino) sets its payouts in advance of a drawing. Payouts are defined by published "paytables". Fundamentally, the player's payout is based on three key factors:
1. How many numbers were chosen on the player's ticket selection (either by player selection, or a quick pick machine function).
2. The number of matches out of those chosen selections.
3. The wager amount.

SUMMARY

With respect to the keno prior art, the N numbers (typically a maximum of 20) for playing a keno game, and hereafter referred to as the "first subset", may be selected by the keno player as their selected keno numbers (or "spots") for a prior art keno game. Selection may optionally occur by a machine providing a "quick pick" number function to select spots on behalf of the keno player. As such, the new invention consists of a bonus game enhancement to the primary game (prior art). The new bonus keno game may be implemented at an existing or new keno venue. The exact configuration of a bonus keno game will be dependent on the rules and regulations for the keno venue. As such, the number of primary spots may optionally be different for a keno bonus game when compared to a prior art keno game. The new bonus keno game may also require a keno player to pay an extra fee to use the bonus feature enhancement or may optionally offer the bonus feature for free ($2.00 is a nonlimiting example for a bonus fee). Additionally, as part of a prior art keno game, the invention may limit the maximum number of played numbers (spots) to a value of M, out of a total number set of P (number pool count, or typically 80). Typical values are M=20, and P=80. When the numbers are drawn for a keno bonus game, the player may match some of the first subset consisting of player primary spots (N) and some of the second subset of bonus number spots (M−N) as a new feature. The player may either be paid based on a traditional paytable (prior art) or the bonus keno venue may optionally introduce a separate paytable for bonus number "hits". Also, as an optional bonus game variation, the bonus game feature should not alter the original prior art paytable (also known as a base game paytable).

A further example of a variant keno bonus game may require a keno player to make a purchase prior to playing the bonus keno game. The definition of a prior purchase can vary widely. An example of a prior purchase requirement might be "dinner for two" at a local restaurant within the casino. The restaurant receipt number would be entered during the process of paying the player fee for the player's bonus keno submission ticket signifying compliance with the bonus game requirement.

A non-limiting example of a bonus game is the following:

A keno game with numbers 1-80, with 20 numbers drawn. A player plays the bonus game and bets 2 spots for the primary selection with a bet of $1.00. The player also selects 8 bonus numbers (2 primary+8 bonus=10 numbers) and pays a $2.00 bonus fee, for a total ticket amount of $3.00. The keno number drawing occurs and the net result for the keno player is 0 primary number hits and 8 bonus number hits, resulting in a payout of $10.00 according to the Figure #5 paytable (with the payout win value based on the selection of only 2 primary spots). The odds of a hit with this keno bonus game example is approximately 1-in-16 (see Figure #4 odds table), and the bonus feature increased the primary odds from 1-in-40 to 1-in-16, which results in a net profit of $7.00. As an option, a keno venue could choose to award a greater payout to the player for hitting more bonus numbers, with the total number of bonus number hits being greater than the original ticket's spot count.

BRIEF DESCRIPTION OF DRAWINGS

FIG. 4 is an example of a prior art keno odds table.

FIG. 5 is an example of a prior art keno paytable.

FIG. 9 is an example of a blank Enhanced Keno submission ticket.

FIG. 10 is an example of a filled in Enhanced Keno submission ticket.

FIG. 11 is an example of a quick pick Enhanced Keno submission ticket.

FIG. 13 is an example of an Enhanced Keno bonus number table.

DETAILED DESCRIPTION

Figure 1:
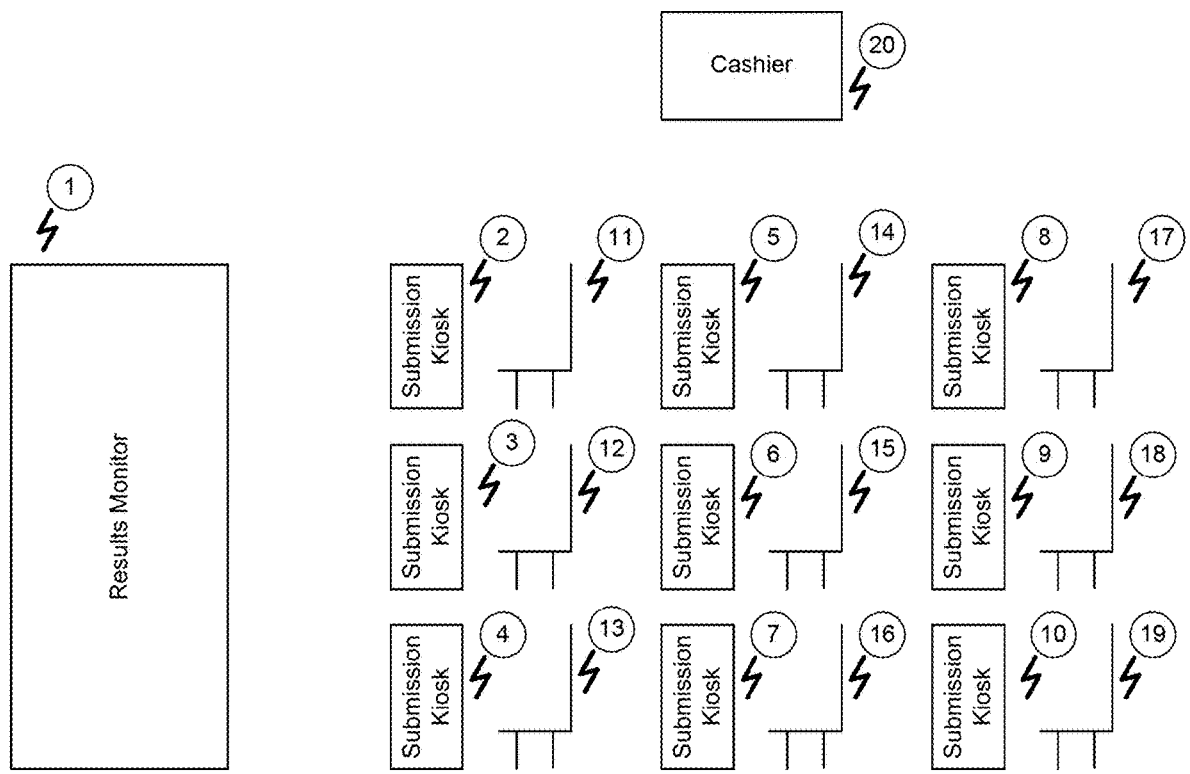
FIG. 1 is an example of a prior art simplified keno parlor block diagram.

The new bonus feature will add extra numbers to enhance the player's wager on the original numbers. The second group of numbers (bonus, hereafter referred as the "second subset") may be machine selected (quick pick) by the keno host system, or a keno player can select the bonus numbers. The second subset may optionally repeat any of the numbers in the first subset, or operate on a "new" number selection or "without replacement" mode (i.e. no numbers will be repeated from the first to the second subset). A mix of first subset and second subset numbers, or both with a potential intermix is permitted and should be specified by the keno venue's rules.

As previously stated, it may also be possible for the first subset of numbers to be selected by a quick pick function, while the second subset is manually selected by the keno player and vice versa. Also, both the first subset and second subset may be established by a quick pick function, or selected by the keno player.

The prior art keno game entry ticket requires a modification to allow the player to select the bonus numbers. For both the first number subset and second number subset, and the numbers for each subset should be identified on the payment receipt ticket supplied by the keno system at the time a player submits their game spots with payment. A player may optionally mark their keno entry forms so that they accommodate multiple game entries. The required fee for each game selected must also accompany the entry form for a player to collect any winnings. The purpose of the bonus Number spots are they will be used as additional matches, resulting in a potential winning outcome that is larger due to a having a higher count of matched numbers.

The keno bonus game (new art or invention) may optionally be played using a "smart personal device". An example of a smart personal device is an Apple iphone. A smart personal device is defined as a wired or wireless electronic device that is capable of performing digital computing and connected to the keno computer using wired or wireless communications. A smart device permits a software application to be downloaded from a remote resource center, such as the Apple App Store (available via the internet). The smart device will support a "virtual" keno game entry form on the smart device, along with a remote payment method.

Optionally, if using a smart device for keno bonus game use, a player may be tracked using their physical location using a global positioning system (GPS) that is built into the smart device. Tracking ensures the keno venue that the player is in a specific geographical region allowing their participation based on regulatory requirements.

The keno bonus game may also be implemented on a standalone machine that is not a "smart device", such as a laptop computer. The standalone machine may provide a touch screen entry and display subsystem. It also may be configured to accept payment with once of the following:
1. Money in the form of paper money
2. Money in the form of coins
3. A voucher payment system
4. Credit card
5. Debit card Selecting Random Keno Numbers:

A method for producing keno numbers may use a "true" random number generator (TRNG) using a random signal source for entropy generation. The entropy is generated by a random electrical signal or mechanical outcome. An example of an entropy source is radioactive decay. In general keno numbers generated by an output of an unpredictable physical process is considered suitable for keno games.

Post Processing in a TRNG:

A "raw" entropy source used in isolation is most likely not going to produce a desirable set of random numbers. The key reason is the probability of a "one" bit will not be the same as a "zero" bit once converted to a digital data stream. The recommended post processing functions to "fix" the bias issue in a raw entropy source is to add some if not all of the following post processing functions:
1. Bit stream "whitener"
2. Hashing function
3. Entropy distiller
4. Modulus function
5. Truncation management A real time statistical verification function is also beneficial but not essential.

1. The bit stream "whitener" will produce even the probabilities of zero and one bits from a raw noise source. Since a uniform distribution of random numbers (finite set) is desirable, it is essential that the bit probabilities be equal to 0.5 or ½. A popular bit stream whitener is the "Von Neumann" algorithm, named after the polymath mathematician and physicist who invented it. Using this method involves sampling the noise source and converting the output signal stream to a digital signal using the following rules:

A. Collect two bits in serial.
B. If a 0, 1 bit pair occurs, output a "one" bit.
C. If a 1, 0 bit pair occurs, output a "zero" bit.
D. If a 1, 1 or 0, 0 bit pair occurs, do not output any results.

The result will produce a balanced probability for 0 and 1 bits.

Since this algorithm performs a 2 to 1 "decimation" on the raw data stream, the raw bit rate must be at least two times the minimum required for real time random number generation.

2. A hash functions converts a finite number of bits (by example 64) in a new bit stream of bits of the same size. For stream modification, a hash function should be specifically a cryptographic hash function. A good method for hashing is the so called "Triple DES" algorithm. Triple DES is a publicly disclosed algorithm that is not hampered by intellectual property restrictions.

3. Entropy distiller: An entropy distiller collects a larger size random bit stream and reduces it to a smaller sample size using mathematical (Boolean) methods to reduce the sample size. An effective method is to use 2 to 1 XOR or exclusive "or" functions to "distill" the stream entropy.

4. Modulus function: Often in gaming applications the random number set to be produced is not of the form $2^n$ (2, 4, 8, 16, 32, etc.), where n is an integer, by example 1-80. To produce a unique uniform number set, the modulus function is used.

5. Truncation function: A truncation function works "in concert" with the modulus function. It's required because the unused number values produced by the modulus function will skew the probabilities of some but not all resulting random numbers produced by the modulus function.

FIG. 1 is a block diagram representing a typical configuration for a keno betting facility. The keno monitor is a large flat screen color display that shows the keno numbers selected by the keno system as they are being drawn. The players can compare their preselected numbers to those numbers actually drawn and shown on the display system. Elements 2, 3, 4, 5, 6, 7, 8, 9, 10 are submission kiosks that keno players can use to submit their keno selections prior to a game drawing. The kiosk 2, 3, 4, 5, 6, 7, 8, 9, 10 can accept payment, and the fee for playing is also accepted by the kiosk. Once the player enters all of their number selections and hit the "submit" button on the kiosk touchscreen, the kiosk 2, 3, 4, 5, 6, 7, 8, 9, 10 will print a receipt for the player. The receipt will be used to collect a monetary prize if a winning result occurs. A game drawing occurs on a specific time schedule, such as every 15 minutes (as a non-limiting example). Elements 12, 13, 14, 15, 16, 17, 18, 19 are chairs provided by the keno venue to provide the keno players a comfortable location to watch the keno proceedings. Once the drawing is complete, a keno player may take their receipt ticket to the cahier's station 20 for prize reimbursement.

Figure 2:
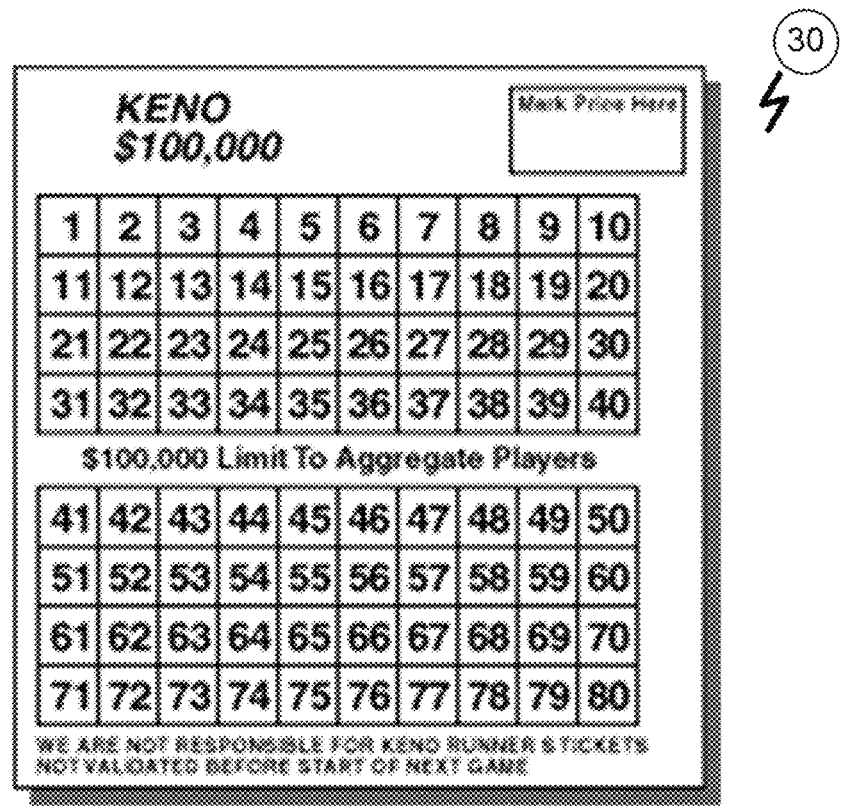
FIG. 2 is an example of a prior art keno submission form.

FIG. 2 is an "OCR" type form 30, which a player can use to identify the numbers they wish to play for a keno game. The form 30 may be optically scanned by the kiosk 2, 3, 4, 5, 6, 7, 8, 9, 10.

Figure 3:
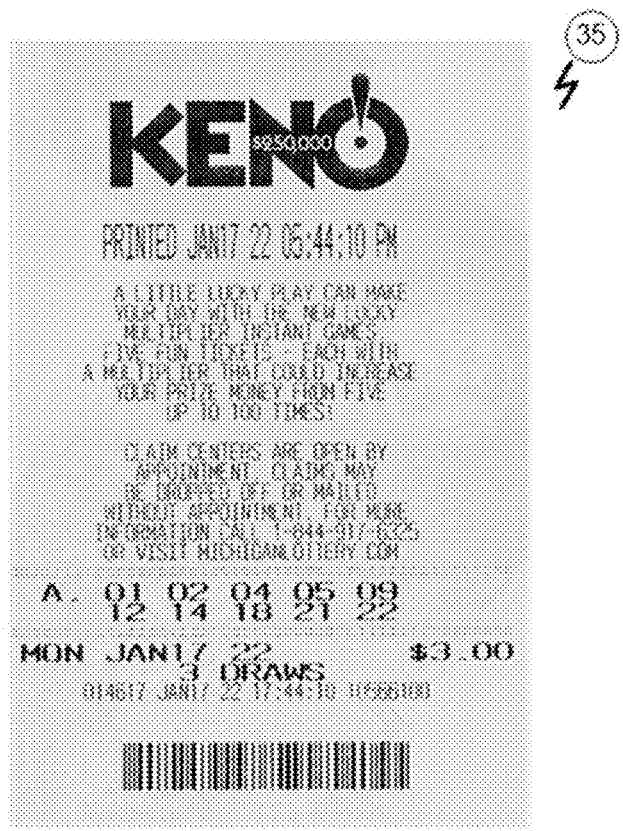
FIG. 3 is an example of a prior art keno receipt ticket.

FIG. 3 is an example of a kiosk ticket receipt 35 produced by a keno kiosk 2, 3, 4, 5, 6, 7, 8, 9, 10 once a player submitted their number selections.

FIG. 4 is a keno odds table, identifying the odds for each type of keno submission. The table may be printed as a handout to a player or posted for viewing or both. The objective of the odds table is to identify what are the possible odds of winning.

FIG. 5 is a paytable showing a player what their potential winnings may be based on the player's number submissions. The paytable is a companion document to odds table.

Figure 6:
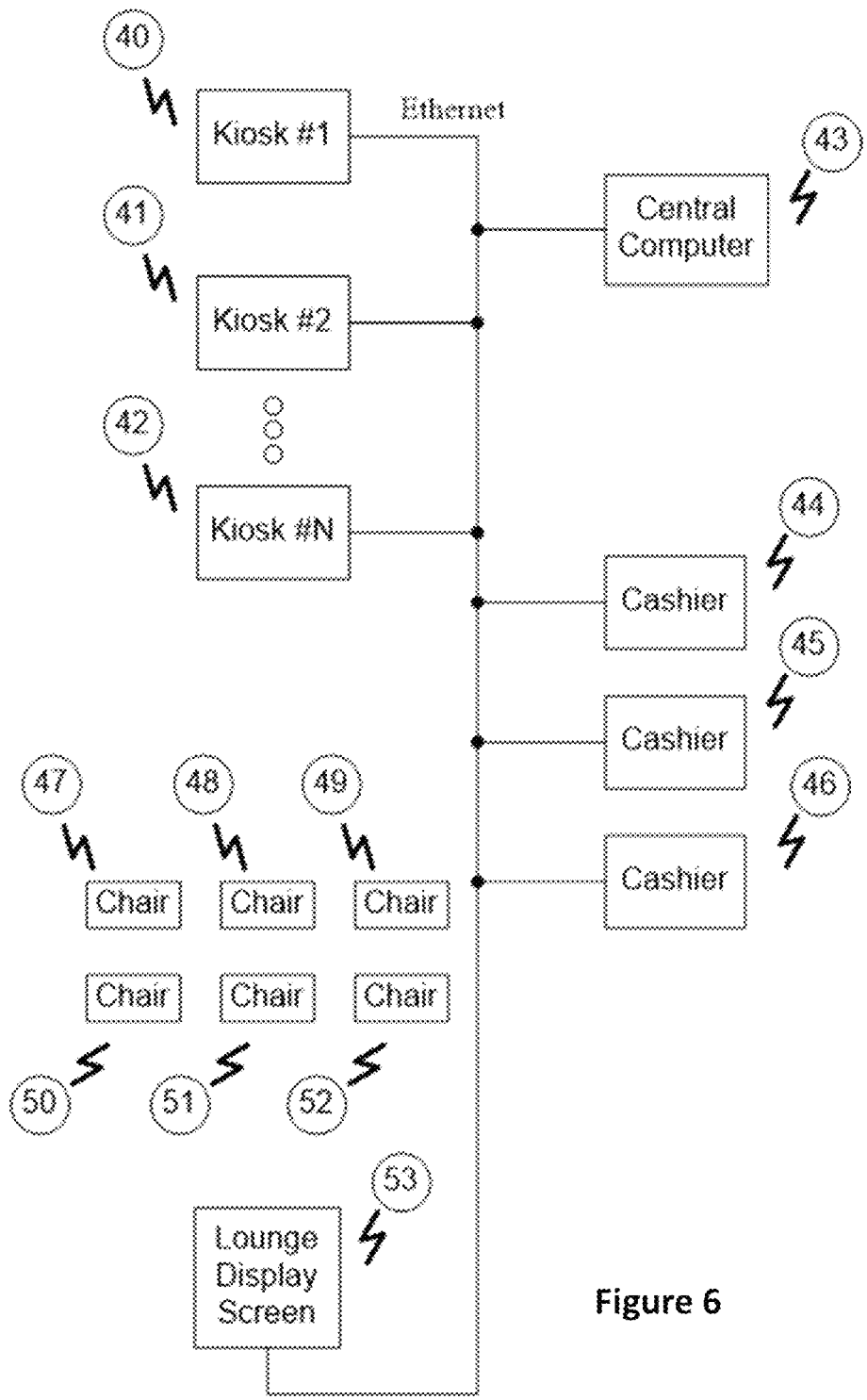
FIG. 6 is an example of an Enhanced Keno lounge block diagram.

FIG. 6 is an example of an Enhanced Keno Lounge. The player can select the numbers they would like to play and submit them at a Kiosk 40, 41, 42, and provide payment for their entry. An Enhanced Keno Lounge can have a variable number of Kiosks 40, 41, 42 available for players to use. Once a player has made their selections and submitted them, the information is sent to a central computer 43 where the selections are logged for the central system. A player will be able to sit in a designated area within the lounge 47, 48, 49, 50, 51, 52 to watch the drawing of numbers. There is a lounge display screen 53 located in the lounge to show the keno drawing result in real time. If the player has a winning ticket, they can go to the cahier 44, 45, 46 to turn in their ticket in exchange for their prize.

Figure 7:
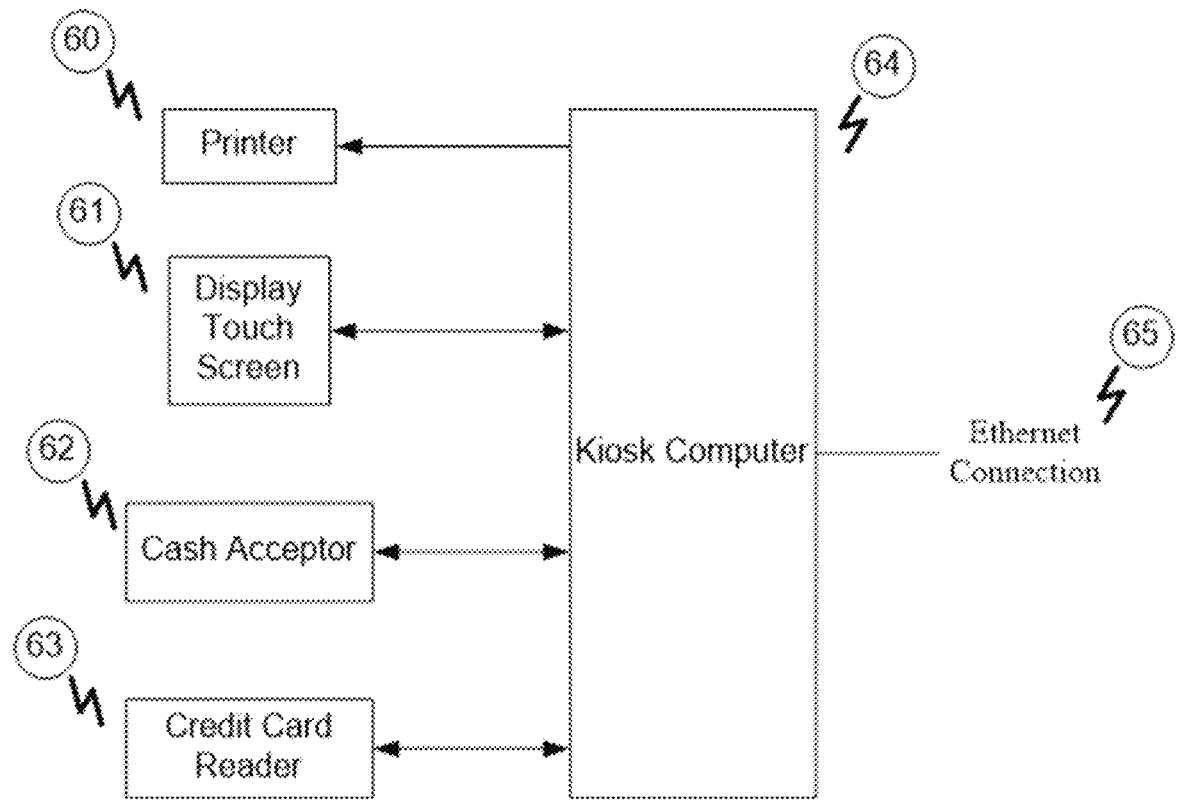
FIG. 7 is an example of an Enhanced Keno player kiosk block diagram.

FIG. 7 is an example of an Enhanced Keno player kiosk block diagram. The kiosk 40, 41, 42 will be equipped with a display touch screen 61. This screen allows the player to input all the necessary information needed to submit an entry. Some examples of information received at the kiosk are the numbers they would like to play, if the player would like a quick pick selection, and how the player would like to make payment for their selection. Once a player submits their picks for an entry, the player will be asked for payment. A player can either pay with cash or a voucher by applying their payment into the kiosk 62 or they can pay with a credit or debit card by swiping their card in the credit card reader 63. Once payment has been accepted, an official submission is processed by the kiosk computer 64 and sent to the central computer 43 by way of a secure Ethernet connection 65. Once the player's submission and payment has been received, the kiosk 40, 41, 42 will use a printer 60 to print a receipt ticket 93 for the player. The player will use this receipt ticket 93 to redeem any winnings if a winning result occurs.

Figure 8:
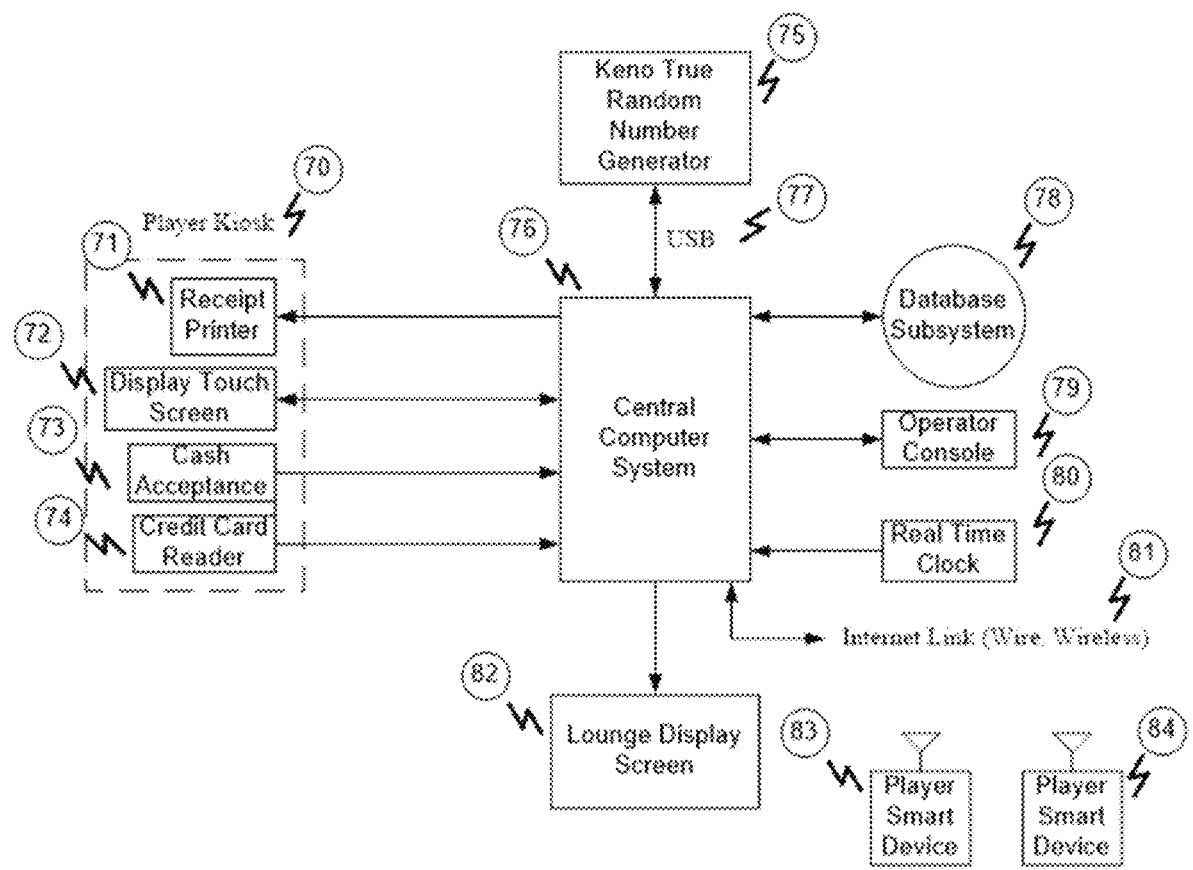
FIG. 8 is an example of an Enhanced Keno system block diagram.

FIG. 8 is an example block diagram of an Enhanced Keno system. The player kiosk 70 contains a receipt printer 71 to print a receipt ticket, a display touch screen 71 for the player to make their number selections, and a cash acceptance 73 method and credit card reader 74 to accept payment from the player. The player kiosk 70 directly communicates all submitted entries to the central computer system 76. Optionally, a player may make their selections on a smart device 83, 84. When the player submits their selections on their smart device 83, 84, the submission and payment information is transmitted to the central computer system 76 via a communications link 81. The central computer system 76 will then store all submitted entries within a database subsystem 78. The central computer system 76 will have an operator console 79 where an authorized operator can access information from the central computer 76. A real time clock 80 will be communicating to the central computer system 76 to time stamp player submissions and make sure the keno drawings are occurring at the proper times. Once the time comes for a drawing to occur, the central computer 76 will communicate with a keno true random number generator 75 through a hardwired USB 77. The keno true random number generator 75 will provide the number selections for a specific number drawing to the central computer system 76. The central computer system 76 will then provide those numbers for the specific keno drawing to the lounge display screen 82, where players will be able to view the results of the drawing and compare their results to determine if they have a winning outcome.

Figure 9:
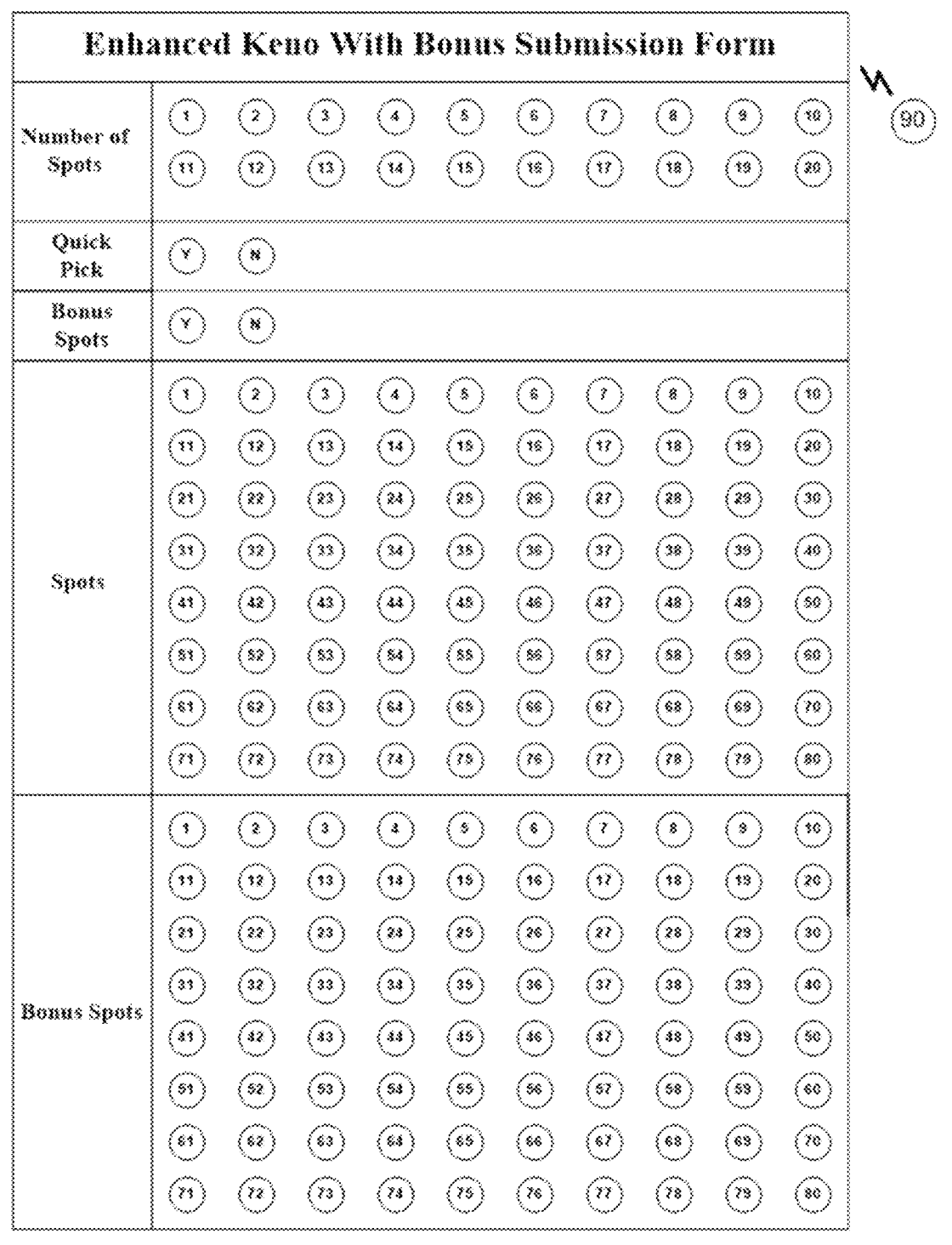

FIG. 9 is an example of a blank enhanced keno submission ticket. The blank Enhanced Keno submission ticket 90 has fields for the player to select the number of spots they would like to play, and if they would like their numbers to be provided as a quick pick. Then, they will select to participate in the bonus spots game and pick the actual number selections for their spots, and then pick the actual number selections for their bonus spots.

Figure 10:
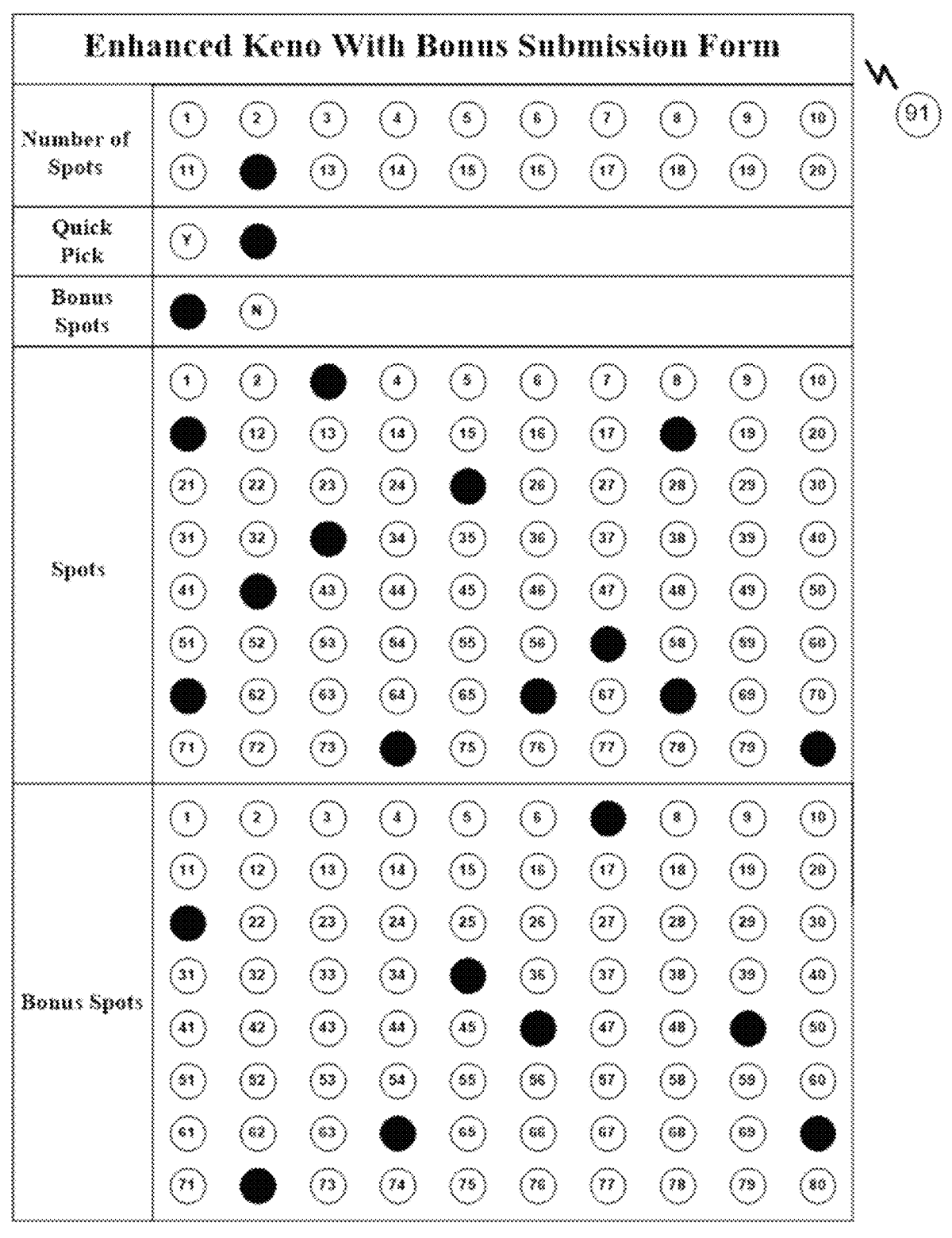

FIG. 10 is an example of a completed Enhanced Keno submission ticket. For this example, the completed Enhanced keno submission ticket 91, a player will select 12 play spots. The player has declined the option to use a quick pick for their number selections and wishes to participate in the bonus spots game. The player has selected the numbers 3, 11, 25, 33, 42, 57, 61, 66, 68, 74, and 80 as their 12 spot entries. Additionally, the player has selected 7, 21, 35, 46, 49, 64, 70, and 72 as their 8 bonus spots.

Figure 11:
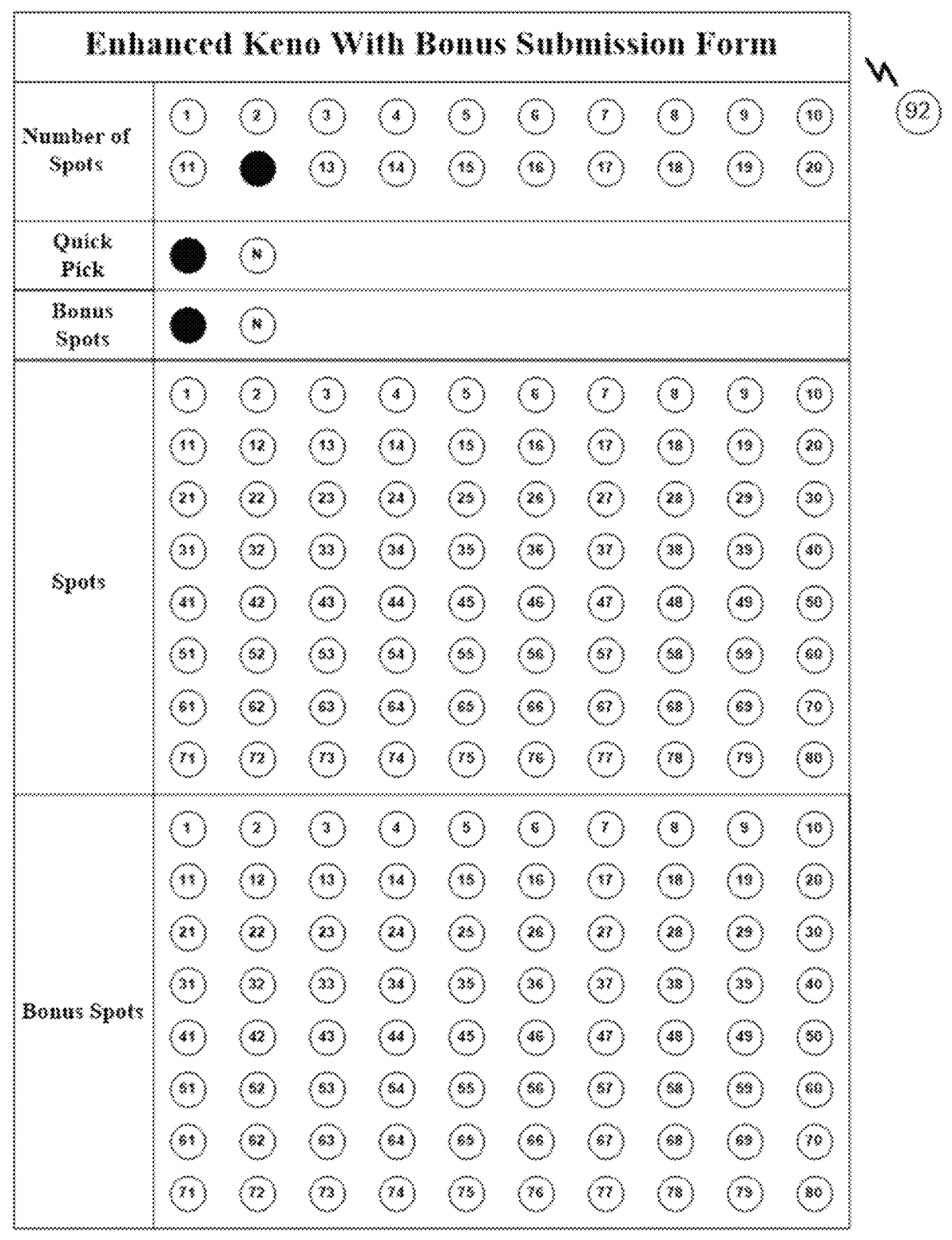

FIG. 11 is an example of a quick pick Enhanced Keno submission ticket. For this example of the quick pick Enhanced Keno submission ticket 92, the player has selected to play 12 spots. The player has also elected to have their number selections made for them by the quick pick feature and finally the player has also elected to participate in the bonus spots game. This submission ticket will result in the player being issued 12 spots to play and an additional 8 bonus spots, all of which will be selected at random by the quick pick function an be reflected on their keno receipt ticket.

Figure 12:
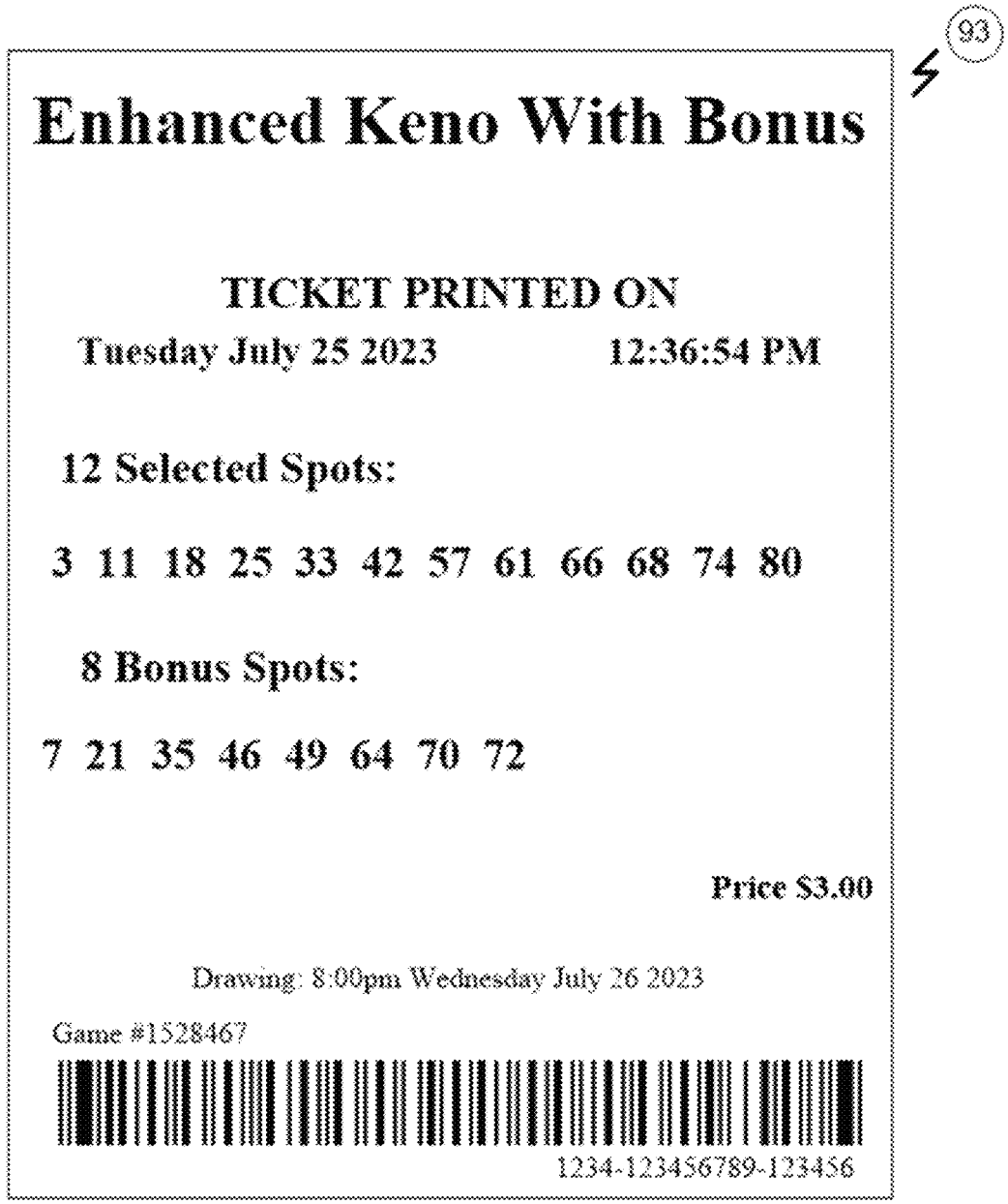
FIG. 12 is an example of an Enhanced Keno receipt ticket.

FIG. 12 is an example of an Enhanced Keno receipt ticket. A player will be issued an Enhanced Keno receipt ticket 93 once they have completed a valid submission. The information contained on the receipt ticket 93 is the date and time the ticket was printed on, the number of spots selected, the number selections for those spots, the number of bonus spots, the number selections for those bonus spots, the price of the ticket, the date and time of the drawing the ticket is valid for, and a game identification number for the drawing, A bar code can be used to scan the ticket and identify the ticket within the database and identify if the ticket had a winning result. It also allows for a search for a unique ticket number that corresponds to the ticket's location in the database.

FIG. 13 is an example of an Enhanced Keno bonus number table. For this example, the table identifies the complete set of numbers in the pool available for selection as the Pool Count (P), which is 80. The Total Spots (M) will be the total number of number selections contained on a player's ticket, which is 20. The Player Plays (N) will be the primary set of number spots a player chooses to select for their submission. The Bonus Numbers (M–N) will be issued based on how many Player Plays (N) are selected. The number of Player Plays (N) will be subtracted from the Total Spots (M). The resulting number from the function of subtracting N from M will be the number of Bonus Numbers issued to the player. By example, a player can select a 12 spot ticket and will be issued 8 additional bonus spots, totaling 20 spots. When the numbers are drawn, the player may match some of the Player Plays spots and some of the Bonus Numbers spots. If a player matches 2 Player Plays spots and 1 Bonus Numbers spot on a 12 spot ticket, the Bonus Numbers spots can be used as a match to make the player's final outcome 3 matches on a 12 spot ticket.

Figure 14:
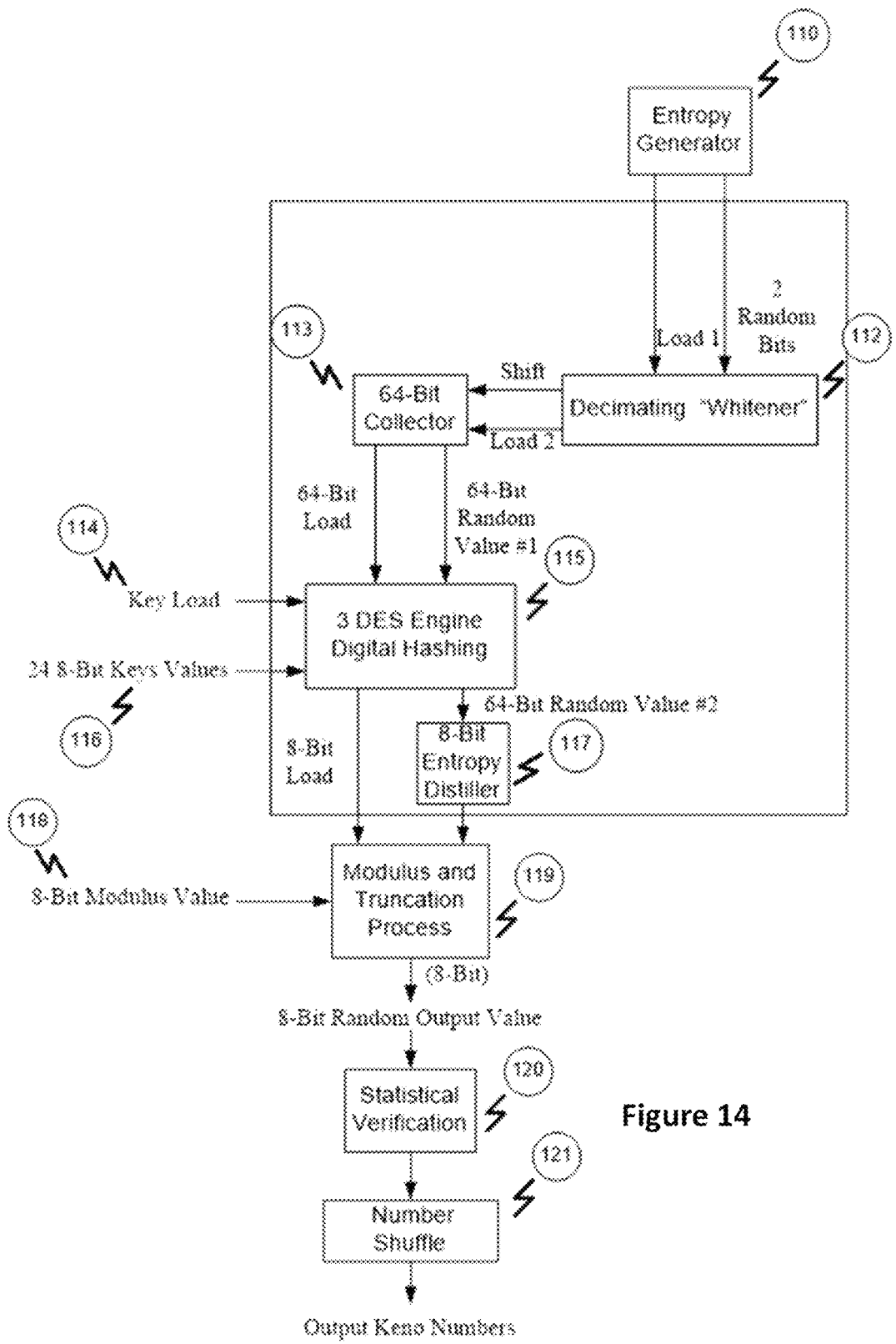
FIG. 14 is an example of a true random number generator block diagram.

FIG. 14 is an example of a hardware based random number generator. FIG. 14 contains the elements to create a true random number generator, and allows for an arbitrary but finite range for the number results.

Description of the elements in FIG. 14 are the following:

The hardware entropy generator 110 produces "biased" random bit sequences. It uses a reversed P-N junction to generate "noise". See FIG. 15 for more details. The Von Neumann "whitener" 112 collects 2 "bits" and makes a decision based on the seral bit values. If both bits are equal, it ignores the result. A 0, 1 will produce a single 1-bit result. A 1, 0 result will produce a 0-bit output. The objective of the whitener is to rebalance the bit probabilities to 50/50%. The collector load 111 "clocks" a 1 or 0 bit into the 64-bit shift register as per Von Neumann "whitener" 112 decisions on bit output values. The 64-bit collector 113 accumulates the binary sequence produced by the Von Neumann "whitener" 112. The output of the "collector" load 111 is fed to the DES engine 115 for "hashing". The DES engine 115 acts as a hashing function with regard to the input values coming from the bit collector 113. The 8-bit entropy distiller 117 converts the "DES hash" results (64-bits) and reduces it to an 8-bit digital value using an "exclusive or" function. DES requires a binary key value. The key load 114 "clocks" the key value (encode or decode) into the DES engine. The 24 8-bit keys values are element 116. Triple DES requires a key value (encode or decode keys are the same) to operate on the "clear text" 64-bit input to the 3-DES engine. The 8-bit modulus value 118 determines the set of numbers produced by the true random number generator. The software modulus and truncation process is found at element 119. The modulus function must take into consideration any truncation errors that may occur. A Chi square statistical verification is element 120. Although not essential to the RNG process, a "real time" verification of the "quality" of the random numbers can be useful to ensure the integrity of the random number generator. The Chi square test can be executed after a "batch" or random numbers has been collected.

Figure 15:
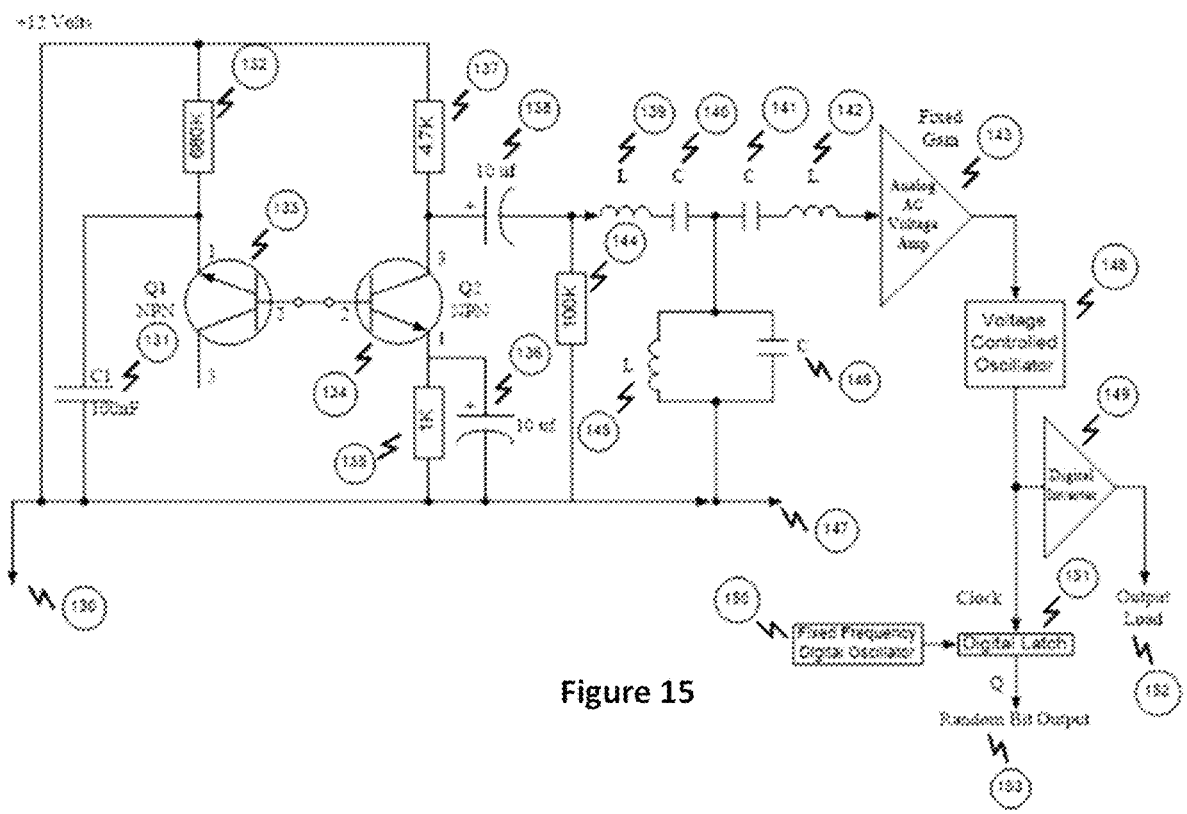
FIG. 15 is an example of a circuit diagram for an electronic entropy generator.

FIG. 15 is an example of a circuit diagram for an entropy generator. The generator produces "noise" from a reversed biased P-N semiconductor junction (in a transistor) and the noise modulates a voltage controlled oscillator (VCO) and produces "jitter". The VCO interacts with a fixed frequency oscillator to produce a digital bit stream consisting of random bits. The probability of 1-bit and 0-bit will not be equal.

The following is a more detailed explanation for the operation of the entropy generator electrical circuit:

Element 133 is an N-P-N type transistor (2N2222 is an example) where the base emitter junction is reversed biased. Resistor 132 feeds a +12 volt DC power feed to the transistor emitter. The ten microfarad capacitor 24 keeps the voltage ripple to a minimum at the connection between the resistor 132 and the transistor emitter 133. The "noise" created at the base of transistor 133 is DC coupled to the base of transistor 134. Transistor 134 is also an N-P-N type. The noise coupled to the base of 134 modulates a signal on the collector of transistor 134. Resistor 137 current limits the power +12 volt feed to the collector. Resistor 132 with capacitor 136 biases up the emitter voltage for transistor 134. The ten microfarad capacitor 138 AC couples the filter consisting of inductors 139, 142, 145 and capacitors 140, 141, 146. Resistor 144 provides a "ground" reference for the filter input. A fixed gain amplifier 143 increases the filter signal amplitude of the filtered noise signal. The output of the amplifier modulates a voltage controlled oscillator 146 (VCO). The VCO interacts with a fixed frequency oscillator 150 by way of the digital latch 151 to produce a random bit output 153. The digital inverter 149 produces a "load" signal to "clock out" true random bit output 151. An electrical ground exists at 130 and 147. Stabilizing capacitor 131 works in conjunction with resistor 132 to bias and feed current to the emitter of Q1 133. Resistor 135 provides a load for the Q2 emitter 134. As Q2 134 is configured as an emitter follower circuit to introduce an impedance transformation. The output load 152 will act as a "clocking signal" to load the random bit output 153 into a "downstream" digital memory device.

Figure 16:
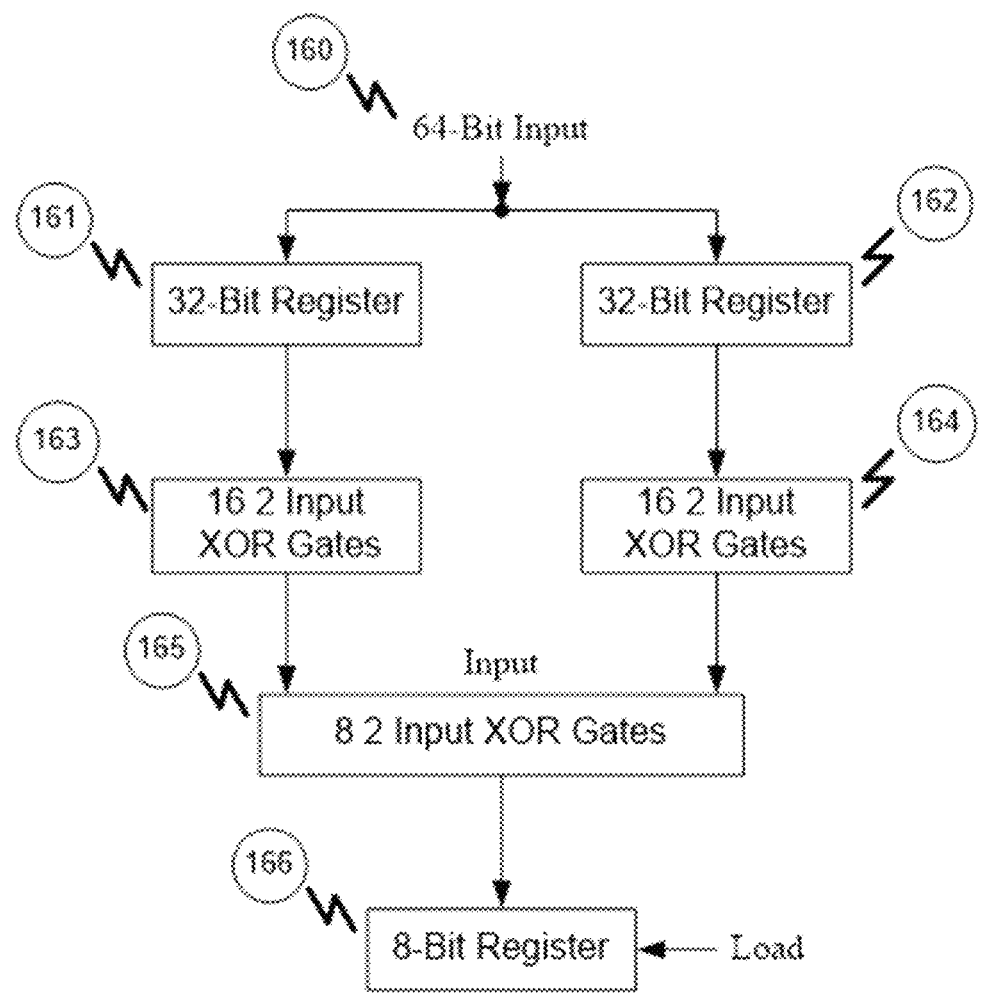
FIG. 16 is an example of an 8-bit entropy distiller block diagram.

FIG. 16 provides detail on the hardware entropy distiller. The 64-bit "random" digital feed 160 is bifurcated into two 32-bit holding registers (161, 162). The "load" clocks for the registers are not shown. The output values of registers 161 and 162 are "exclusive ored" together to form two 16-bit parallel stream random outputs 163, 164, which are fed into an 8-bit "exclusive or" gate network 165. The output of 165 is "latched" into an 8-bit register 166.

Figure 17:
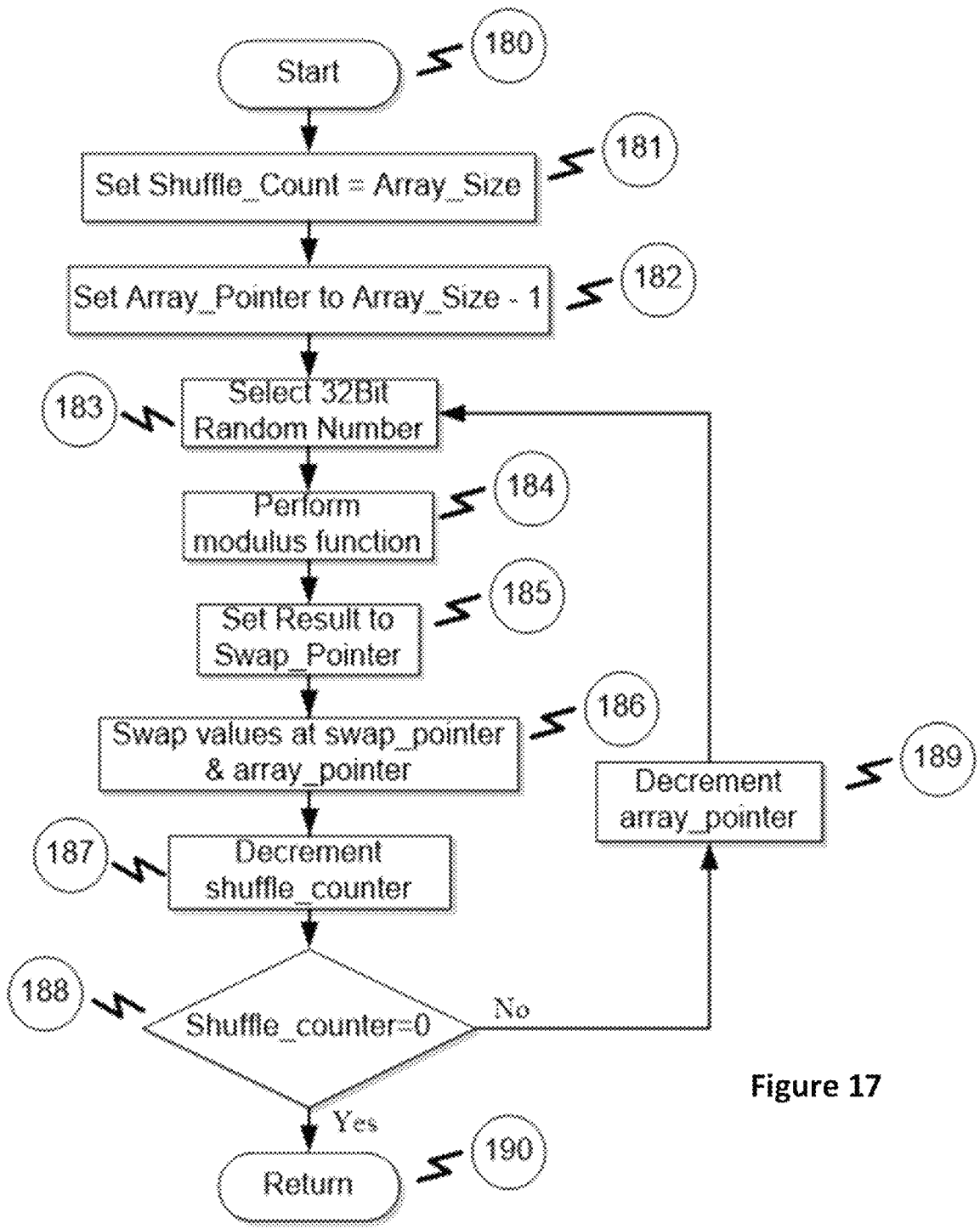
FIG. 17 is a flow chart of a shuffle function.

FIG. 17 illustrates a process flow chart for the Durstenfeld Shuffle function which may be used to randomize the keno data array used to select N random numbers for a keno drawing. The process enters the function through the Start 180 block. The Shuffle_Count variable must be set to equal the Array_Size 181 and the Array_Pointer variable is set to Array_Size 182. Once a True Random Number is generated 183 a non-truncated biased modulus function is performed 184 to ensure the Random Number generated is within the range of 0 to Array_Pointer. The result of the modulus function is set to the Swap_Pointer 185 and the values in the array stored at Array_Pointer and Swap_Pointer are transposed 186. The variable shuffle_count is decremented by one 187 and checked to see if it is equal to zero 188. If shuffle_count is not equal to zero, there are more elements to shuffle so array_pointer is decremented by one 189 and the process repeats from the selection of the number 183. Once shuffle_count equals zero, the shuffle of the array has been completed and the function can return 190.

The invention claimed is:

1. A system for playing a keno game comprising:
a device configured to verify whether a player of the keno game has already completed a prior non-keno game transaction before providing a first set of P numbers for a player to select N main numbers from, and a second separate set of same P numbers for the player to select M-N bonus numbers from;
wherein the total number of main and bonus numbers selected by the player for the same keno game is M, wherein M has a maximum limit and is less than P, and a total winning for the keno game is determined based on different payouts assigned to: 1) the total number of main and bonus numbers M selected by the player, and 2) matching of the selected N main numbers and M-N bonus numbers to a keno game drawing result; and
a hardware based true random number generator configured to randomly generate drawing numbers in a predetermined range as the drawing result for the keno game for comparison with the main numbers and the bonus numbers selected by the player to determine the total wining for the keno game.

2. The system of claim 1 wherein:
the true random number generator is based on noise generated by a reversed biased semiconductor device.

3. The system of claim 1 wherein:
a noise source of the true random number generator is sampled by a fixed frequency oscillator.

4. The system of claim 1 wherein:
the true random number generator comprises one or more exclusive OR gates producing a resource for distilling entropy.

5. The system of claim 1 wherein:
the device is an electronic device.

6. A system for playing a keno game comprising:
a game ticket configured to provide a first set of P numbers for a player to select N main numbers from; and a second separate set of same P numbers for the player to select M-N bonus numbers from, wherein the keno game ticket is provided after the player of the Keno game has already completed a prior non-keno game transaction;
wherein the total number of main and bonus numbers selected by the player for the same keno game is M, wherein M has a maximum limit and is less than P, and a total winning for the keno game is determined based on different payouts assigned to: 1) the total number of main and bonus numbers M selected by the player, and 2) matching of the selected N main numbers and M-N bonus numbers to a keno game drawing result; and
a hardware based true random number generator configured to randomly generate drawing numbers in a predetermined range as the drawing result for the keno game for comparison with the main numbers and the bonus numbers selected by the player.

7. The system of claim 6 wherein:
the N main numbers and M-N bonus numbers are selectable by a machine via a quick pick selection by the player.

* * * * *